United States Patent [19]

Foreman et al.

[11] Patent Number: 4,984,939

[45] Date of Patent: Jan. 15, 1991

[54] PNEUMATIC TUBE TRANSMISSION SYSTEM WITH SLOW-DOWN BLOWER

[75] Inventors: Michael J. Foreman, Carrollton; Harold R. Greene, Farmers Branch, both of Tex.

[73] Assignee: ComCo Systems, Dallas, Tex.

[21] Appl. No.: 345,403

[22] Filed: May 1, 1989

[51] Int. Cl.⁵ .................. B65G 51/20; B65G 51/34
[52] U.S. Cl. ........................................ 406/84; 406/112
[58] Field of Search .................. 406/84, 112, 13, 176, 406/180

[56] References Cited

U.S. PATENT DOCUMENTS

| | | | |
|---|---|---|---|
| 1,517,671 | 12/1924 | Dinspel | 406/176 |
| 2,698,721 | 1/1955 | Van Otteren | 406/112 |
| 3,711,038 | 1/1973 | Van Otteren | 406/84 X |
| 4,178,662 | 12/1979 | Borodin | 406/84 X |

FOREIGN PATENT DOCUMENTS

| | | | |
|---|---|---|---|
| 260464 | 1/1964 | Australia | 406/84 |
| 1916784 | 10/1969 | Fed. Rep. of Germany | 406/84 |
| 6412515 | 4/1965 | Netherlands | 406/112 |
| 1147654 | 3/1985 | U.S.S.R. | 406/84 |
| 917305 | 1/1963 | United Kingdom | 406/84 |
| 1005129 | 9/1965 | United Kingdom | 406/84 |

*Primary Examiner*—Joseph F. Peters, Jr.
*Assistant Examiner*—James M. Kannofsky
*Attorney, Agent, or Firm*—Richards, Medlock & Andrews

[57] ABSTRACT

A pneumatic transmission system is provided. The system comprises a transmission tube having a first end and a second end. A blower adapted to force air from the first end to the second end of the transmission tube is interconnected to the first end of the transmission tube. A vacuum source having a capacity at least as great as that of the blower is connected to the transmission tube proximal the second end. The vacuum source creates a flow of air from the second end of the transmission tube to the vacuum source, thereby decelerating a carrier being transmitted to the second end of the transmission tube.

15 Claims, 1 Drawing Sheet

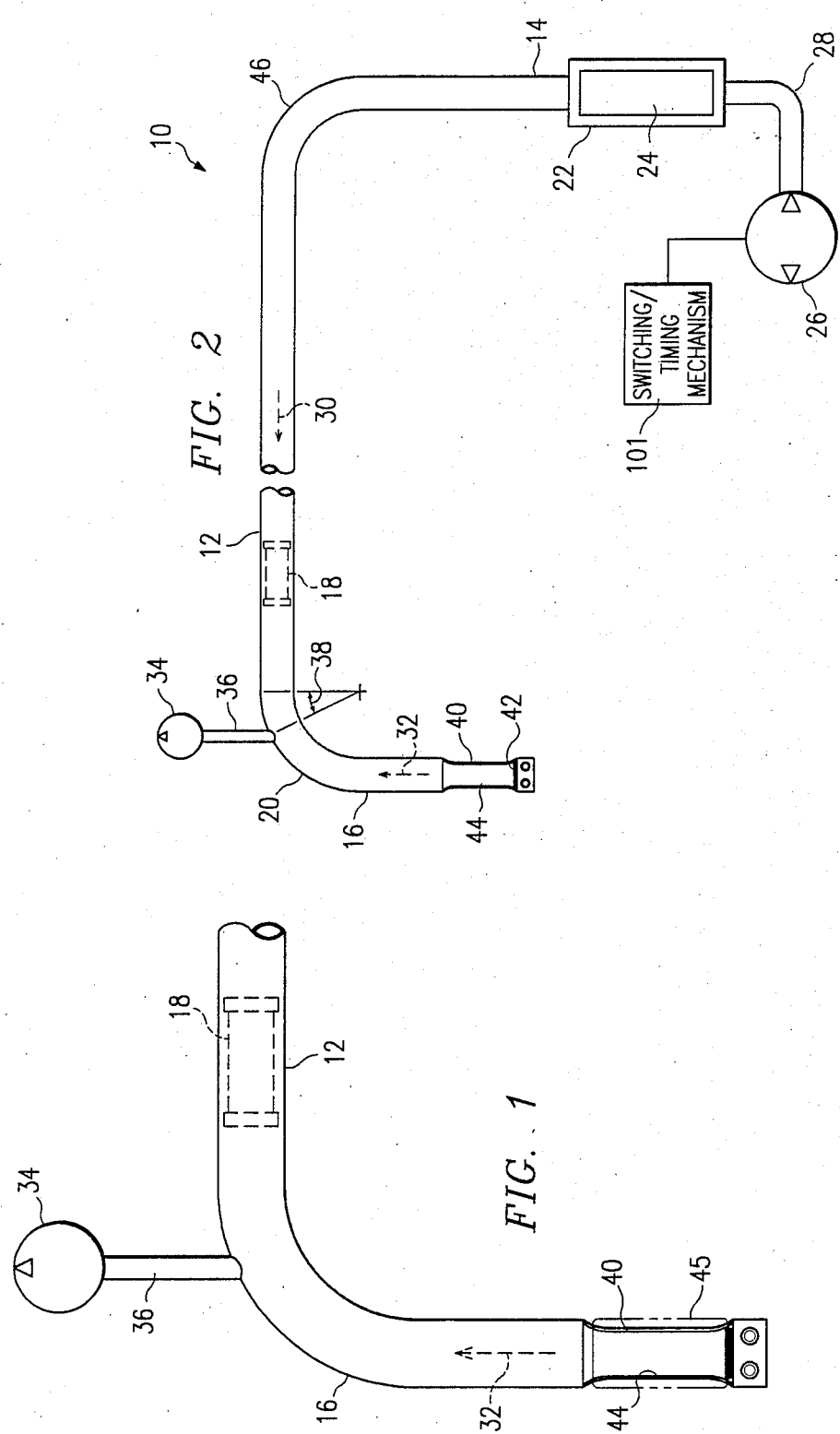

PNEUMATIC TUBE TRANSMISSION SYSTEM WITH SLOW-DOWN BLOWER

FIELD OF THE INVENTION

The invention relates to a pneumatic tube transmission system having an open terminal and a slow-down blower that draws air through the open terminal, creating a counterflow of air which decelerates a carrier approaching the open terminal.

BACKGROUND

The present invention is a pneumatic tube transmission system for transmitting a carrier from an initial terminal to a remote terminal. The invention particularly relates to a transmission system having at least one open terminal and utilizing a slow down blower to create a deceleration zone adjacent the open terminal. The addition of the slow down blower allows the carrier to be pneumatically transmitted from the initial terminal toward the remote open terminal and then decelerated in the deceleration zone, thereby avoiding a high velocity impact between the carrier and the open terminal. The open terminal of the present invention does not require a door, thus allowing the carrier to be removed from the transmission system with a single hand.

Pneumatic transmission systems are widely known and used to transmit articles from one location to another. Typically, the transmission systems consist of tubes or conduits in which a carrier containing documents, samples, or other objects travels by means of pneumatic pressure. The pressure is provided by use of a blower and/or vacuum system. Pneumatic transmission systems are commonly used in drive-in bank tellers where business is conducted via a carrier transmitted between the bank teller and an external terminal in the drive-in area. Pneumatic transmission systems are also used for sending documents between floors and/or offices within the same building, or from one office to another office located some distance apart. Recently, pneumatic transmissions systems have been used by hospitals and clinics for transmitting "fragile cargo" such as blood samples to the laboratory for testing.

In previous pneumatic transmission systems, the carrier would travel through a tube and impact a stop device once it had reached its intended location. In many pneumatic systems, the carrier travels at speeds of 15–20 feet/second or higher, and the impact of the carrier against the stop device can cause great wear on both the carrier and the system. One method for obviating the high velocity impact between the carrier and stop device has employed the use of an air cushion adjacent the receiving terminal. The air cushion is created by pneumatically sealing the receiving terminal and thus creating a trapped column of air which serves to decelerate or "cushion" the carrier. However, such an air cushion system requires that the receiving terminal have a door capable of pneumatically sealing the terminal. The system operator must then manually open the terminal door in order to retrieve the carrier from the system. Alternatively, a complicated mechanism can be provided to automatically open the terminal door upon the arrival of the carrier. However, such mechanisms are often costly and prone to mechanical failures at inopportune times.

Other attempts to resolve the problem of the impact have included the use of other trigger means to shut off the stream of air. These alternative trigger means include such items as a photocell, a timing device, a limit switch, a spring catch, and combinations thereof.

An alternative system in which a carrier is decelerated prior to entering an open terminal area is disclosed in U.S. Pat. No. 4,180,354 to Greene. U.S. Pat. No. 4,180,354 discloses a transmission system in which the pressurized air behind the carrier is routed principally through a check valve positioned near the open terminal to allow the carrier sufficient time to decelerate before discharging into an open terminal. An adjustable gate allows some air to continue to push the carrier to the terminal. A secondary air line adjacent to the open terminal draws in the air from the main transmission line and reroutes it to the blower, thus avoiding the blowing of air through the open terminal. The carrier is decelerated by simply choking off most of the air behind it at a point near the open terminal so that the carrier ejects with a minimum speed from the transmission line into the open terminal.

SUMMARY OF THE INVENTION

The pneumatic transmission system of the present invention includes a blower, a transmission tube, a vacuum source, and an open terminal. The blower forces air through the transmission tube toward the open terminal and has a capacity sufficient to force a carrier through the system. The vacuum source is in communication with the interior of the transmission tube and preferably has a capacity at least as great as the capacity of the blower. The vacuum source is thus able to withdraw from the transmission tube all air directed by the blower as well as creating a counter flow of air from the open terminal toward the vacuum source. This counter flow creates a deceleration zone within the transmission tube whereby a carrier being transported to the open terminal is substantially decelerated or stopped prior to arriving at the open terminal.

BRIEF DESCRIPTION OF THE DRAWINGS

A more complete understanding of the present invention and its advantages will be apparent from the following Detailed Description read in conjunction with the accompanying drawings, in which:

FIG. 1 is a side plan view of the transmission tube, vacuum source, and second terminal of the present invention.

FIG. 2 is a side plan view of the pneumatic transmission system of the present invention.

DETAILED DESCRIPTION

A pneumatic transmission system according to the present invention is generally indicated at 10 of FIG. 2. Pneumatic transmission system 10 includes transmission tube 12 having a first end 14 and a second end 16. Transmission tube 12 has a sufficient internal diameter such that a carrier 18 can be transmitted therethrough. Transmission tube 12 can have any spatial orientation and may include curved portions, dependent upon the circumstances under which the system is to be used. In a preferred embodiment, curved tubular section 20 is disposed between first end 14 and second end 16 of transmission tube 12. Curved tubular section 20 has an internal diameter substantially equivalent to that of tube 12 such that carrier 18 is readily transmitted therethrough. It is to be appreciated that carrier 18 and system 10 can have nearly any dimension and cross-section, dependent upon the purpose for which the system is to be used. For the purposes of this disclosure, "transmission tube" shall be defined so as to include a transmission line of any cross-sectional form having a channel formed therethrough.

A first terminal 22 is interconnected to first end 14 of transmission tube 12. A door 24 is mounted on first terminal 22 in order to facilitate the placement and removal of carrier 18 from system 10. First terminal 22 is preferably substantially sealed from the external environment when door 24 is closed. First terminal 22 can be of any construction whereby carrier 18 can be placed in and removed from the pneumatic transmission system and whereby terminal 22 can be substantially isolated from the ambient pressure.

A blower 26 is connected to first terminal 22 by pressure tube 28. Blower 26 is adapted to provide compressed air to transmission tube 12 in the direction generally indicated by arrow 30. In a preferred embodiment, blower 26 is reversible and is thereby also able to create a flow of air through transmission tube 12 in the direction generally indicated by arrow 32. It should be appreciated that in this preferred embodiment, system 10 can be used to transport carrier 18 in directions 30 and 32. Where blower 26 is unidirectional, system 10 transports carrier 18 only in direction 30. Return of carrier 18 would be achieved through the use of a parallel, mirror image pneumatic transmission system.

Vacuum source 34 is connected to transmission tube 12 by tube 36. In the preferred embodiment, vacuum tube 36 is connected to curved tubular section 20. The precise position of vacuum tube 36 along curved tubular section 20 is dependent upon the weight of carrier 18 and its contents as well as the overall dimension of system 10. It has been found that vacuum source 34 20 provides its optimal effect when angle 38 is between 60° and 90°. However, angle 38 can have any measure without departing from the spirit and scope of the present invention.

Vacuum source 34 has a capacity at least as great as the capacity of blower 26 and is thereby able to create a flow of air through second end 16 in the direction generally indicated by arrow 32. That is, vacuum source 34 concurrently draws off all of the air flow created by blower 26 and creates a flow of air through second end 16 in the direction generally indicated by arrow 32. In this manner, second end 16 becomes a deceleration zone for carrier 18 as it is transmitted through transmission tube 12. In the preferred embodiment, the capacity of vacuum source 34 is adjustable such that the magnitude of air flow through second end 16 can be varied in relation to the weight of carrier 18.

Second terminal 40 is interconnected to second end 16 of transmission tube 12. Second terminal 40 includes an end block 42 and an access port 44. Second terminal 40 is open to ambient pressure at all times such that air can be drawn through second terminal 40 into second end 16 of transmission tube 12. Second terminal 40 is open to ambient pressure in the preferred embodiment as a result of access port 44 being open at all times. It should be appreciated that a door 45 can be provided for access port 44 so long as second terminal 40 is in communication with the ambient pressure. This can be achieved, for example, through the use of a check valve mounted on terminal 40.

In operation, the pneumatic transmission system of the present invention provides transportation of carrier 18 between first terminal 22 and second terminal 40. For example, when the pneumatic transmission system of the present invention is employed in a drive-in bank facility, first terminal 22 is positioned outside the banking facility. First end 14 of transmission tube 12 includes curved portion 46 such that carrier 18 is directed vertically prior to being transported horizontally into the banking facility. Second end 16 of transmission tube 12 is also disposed substantially vertically. However, it is to be appreciated that system 10 will function equally as well in numerous other spatial orientations.

After carrier 18 is placed in first terminal 22 and door 24 is closed, blower 26 is activated such that pressurized air is directed in the direction of arrow 30, thus forcing carrier 18 through transmission tube 12. As carrier 18 approaches curved tubular section 20, its momentum will decrease slightly due to friction between transmission tube 12 and carrier 18. Carrier 18 is rapidly decelerated when it enters second end 16 due to the counter flow of air created by vacuum source 34. As a result, carrier 18 approaches second terminal 40 at a relatively low velocity, thus decreasing the severity of the impact between carrier 18 and end block 42. Carrier 18 can then be removed from second terminal 40 through access port 44. Removal is greatly facilitated in that second terminal 40 does not require a door. The bank teller is thus able to remove the carrier 18 from system 10 with only one hand and without the need for a door-opening mechanism.

Upon completion of the banking transaction, carrier 18 can be replaced in second terminal 40. Carrier 18 is then returned to first terminal 22 by activating reversible blower 26 such that it creates a flow of air through transmission tube 12 in the direction indicated by arrow 32. Vacuum source 34 is deactivated during the return of carrier 18 to first terminal 22. In a preferred embodiment, a switching/timing mechanism 101 is employed in order to ensure that vacuum source 34 is not active during transmission of carrier 18 from second terminal 40 to first terminal 22.

In an alternative embodiment of the present invention, both first terminal 22 and second terminal 40 are open to the ambient pressure. In this embodiment, a vacuum source is disposed proximal each of the terminals, thus creating deceleration zones adjacent to each terminal. In another embodiment, multiple terminals are connected to a single pneumatic transmission system. Deceleration zones are created adjacent to each terminal in the manner discussed above and depicted in FIGS. 1 and 2. It will be appreciated that a series of gates will be disposed in the pneumatic transmission system of this embodiment in order to select the proper terminal for transmission.

While the pneumatic transmission system of the present invention has been described herein with respect to a preferred embodiment, it will be evident that various and further modifications are possible without departing from the spirit and scope of the invention.

We claim:
1. A pneumatic transmission system comprising:
a transmission line having a channel formed therethrough, said transmission line having a first end and a second end, said second end being subjected to ambient pressure;
a blower adapted to provide pressurized air to said first end of said transmission line, said blower having a predetermined air capacity; and
a vacuum source having an air capacity at least as great as the air capacity of said blower, said vac- uum source interconnected to said channel formed through said transmission line at a position proximal said second end relative to said blower, whereby said vacuum source creates a flow of air from said second end to said vacuum source through said channel formed through said transmission line during operation of said blower and said vacuum source, and whereby said flow of air from said second end to said vacuum source decelerates a carrier moving from said first end to said second end of said transmission line.

2. The pneumatic transmission system of claim 1 wherein said blower is reversible.

3. The pneumatic transmission system of claim 1 wherein an open terminal is interconnected to said second end of said transmission line, said open terminal comprising an end block and an access port.

4. The pneumatic transmission system of claim 1 wherein a terminal is interconnected to said second end of said transmission line, said terminal comprising an end block, an access port, and a means for closing said access port.

5. The pneumatic transmission system of claim 1 wherein said transmission line further comprises a curved section disposed between said first end and said second end.

6. The pneumatic transmission system of claim 5 wherein said vacuum source is interconnected to said transmission line at said curved section.

7. The pneumatic transmission system of claim 1 wherein said vacuum source includes a switching means whereby said vacuum source is activated when said blower forces air from said first end to said second end.

8. A pneumatic transmission system comprising:
a transmission line having a channel formed therethrough, said transmission line having a first end and a second end, said second end being subjected to ambient pressure;
a reversible blower adapted to alternately provide pressurized air and a vacuum to said first end of said transmission line, said reversible blower having a predetermined air capacity;
a vacuum source having an air capacity at least as great as the air capacity of said blower, said vacuum source interconnected to said channel formed through said transmission line at a position proximal said second end relative to said blower, whereby said vacuum source creates a flow of air from said second end to said vacuum source through said channel formed through said transmission line during operation of said blower and said vacuum source, and whereby said flow of air from said second end to said vacuum source decelerates a carrier moving from said first end to said second end of said transmission line.

9. The pneumatic transmission system of claim 8 wherein an open terminal is interconnected to said second end of said transmission line, said open terminal comprising nan end block and an access port.

10. The pneumatic transmission system of claim 8 wherein said transmission line further comprises a curved section disposed between said first end and said second end.

11. The pneumatic transmission system of claim 10 wherein said vacuum source is interconnected to said curved section.

12. The pneumatic transmission system of claim 8 wherein said vacuum source has a capacity greater than the capacity of said reversible blower.

13. The pneumatic transmission system of claim 8 wherein said vacuum source includes a switching means whereby said vacuum source is activated when said reversible blower forces air from said first end to said second end and whereby said vacuum source is deactivated when said reversible blower draws air from said second end to said first end.

14. A pneumatic transmission system comprising:
a transmission line having a channel formed therethrough, said transmission line having a first end and a second end, said second end being subjected to ambient pressure;
a reversible blower adapted to alternately provide pressurized air and a vacuum to said first end of said transmission line, said reversible blower connected to said first end of said transmission line, and said reversible blower having a predetermined air capacity;
a first terminal interconnected to said first end of said transmission line, said first terminal having an aperture formed therethrough whereby a carrier can be readily inserted or removed from said first terminal;
a curved transmission line section having a channel formed therethrough disposed between said first end and said second end of said transmission line;
a vacuum source having an air capacity at least as great as the air capacity of said blower, said vacuum source interconnected to said channel formed through said transmission line at a position proximal said second end relative to said blower, whereby said vacuum source creates a flow of air from said second end to said vacuum source through said channel formed through said transmission line during operation of said blower and said vacuum source, and whereby said flow of air from said second end to said vacuum source decelerates a carrier moving from said first end to said second end of said transmission line;
a second terminal interconnected to said second end of said transmission line, said second terminal comprising an end block and having an access port formed therethrough.

15. The pneumatic transmission system of claim 14 further comprising a carrier having dimensions whereby it can be pneumatically transmitted through said transmission line.

* * * * *